United States Patent
Teng et al.

(10) Patent No.: US 9,932,271 B2
(45) Date of Patent: Apr. 3, 2018

(54) GYPSUM COMPOSITES CONTAINING CEMENTITIOUS MATERIALS AND METHODS

(71) Applicant: Georgia-Pacific Gypsum LLC, Atlanta, GA (US)

(72) Inventors: Yi-Hsien Harry Teng, Duluth, GA (US); Mark Alexander Leavitt, Lawrenceville, GA (US); Jeffrey T. Fields, Suwanee, GA (US); Vincent B. Thomas, Bogart, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 325 days.

(21) Appl. No.: 14/560,571

(22) Filed: Dec. 4, 2014

(65) Prior Publication Data

US 2015/0158766 A1 Jun. 11, 2015

Related U.S. Application Data

(60) Provisional application No. 61/912,581, filed on Dec. 6, 2013.

(51) Int. Cl.
| | | |
|---|---|---|
| *C04B 11/28* | (2006.01) | |
| *C04B 28/14* | (2006.01) | |
| *C04B 28/32* | (2006.01) | |
| *C04B 28/34* | (2006.01) | |

(52) U.S. Cl.
CPC .......... *C04B 28/145* (2013.01); *C04B 28/147* (2013.01); *C04B 28/32* (2013.01); *C04B 28/34* (2013.01); *Y02W 30/92* (2015.05); *Y02W 30/94* (2015.05); *Y02W 30/97* (2015.05)

(58) Field of Classification Search
CPC .............................. C04B 11/00; C04B 11/28
See application file for complete search history.

(56) References Cited

U.S. PATENT DOCUMENTS

| | | | | |
|---|---|---|---|---|
| 2,292,616 | A * | 8/1942 | Dailey | C04B 28/14 106/720 |
| 4,114,384 | A * | 9/1978 | Kennedy-Skipton | C04B 24/383 106/779 |
| 5,340,612 | A * | 8/1994 | Perito | C04B 28/04 106/15.05 |
| 5,718,759 | A * | 2/1998 | Stav | A62D 1/0007 106/18.11 |
| 7,056,964 | B2 * | 6/2006 | Lettkeman | C04B 22/143 524/5 |
| 7,651,564 | B2 * | 1/2010 | Francis | C04B 28/147 106/695 |

OTHER PUBLICATIONS

DE 2359290 (Jun. 12, 1975) Aignesberger et al. abstract only.*
JP 51136717 A (Nov. 26, 1976) abstract only.*
CN 102276227 A (Zhang) Dec. 14, 2011 abstract only.*

* cited by examiner

*Primary Examiner* — Paul D Marcantoni
(74) *Attorney, Agent, or Firm* — Ram W. Sabnis

(57) ABSTRACT

Gypsum composites containing cementitious materials and methods of making the same are provided. Gypsum composites include gypsum and a cementitious material. Methods of making gypsum composites include combining gypsum stucco, water, and a cementitious material to form a slurry, and setting and drying the slurry to form a gypsum composite.

11 Claims, No Drawings

GYPSUM COMPOSITES CONTAINING CEMENTITIOUS MATERIALS AND METHODS

CROSS-REFERENCE TO RELATED APPLICATIONS

This application claims priority to U.S. Provisional Patent Application No. 61/912,581, filed Dec. 6, 2013, the disclosure of which is incorporated by reference herein.

BACKGROUND

The present disclosure relates generally to the field of gypsum products, and more particularly to gypsum composites containing cementitious materials and methods of making the same.

Gypsum composites, such as gypsum boards and panels, are used in a variety of building and construction applications where improved fire resistance and strength properties are desirable. For example, gypsum panels are used in wall, door, floor, ceiling, roof, and other commercial and residential building applications. Typically, gypsum panels may be used as drywall and in other situations where a fire-resistance rating is desirable.

Accordingly, there is a need for gypsum products having improved fire resistance, strength, and hardness characteristics.

SUMMARY

In one aspect, a method of making a gypsum composite is provided, including combining gypsum stucco, water, and a cementitious material to form a slurry, and setting and drying the slurry to form a gypsum composite.

In another aspect, a gypsum composite is provided, including a cured composite of gypsum and a cementitious material.

DETAILED DESCRIPTION

Disclosed herein are gypsum composites containing cementitious materials and methods of making the same. These gypsum composites and methods meet one or more of the above-described needs by providing gypsum products having improved fire resistance, strength, and hardness properties.

Methods of Making Composites

In certain embodiments, methods of making a gypsum composite are provided. In one embodiment, a method includes combining gypsum stucco, water, and a cementitious material to form a slurry, and setting and drying the slurry to form a gypsum composite.

As used herein, the term "cementitious material" refers to any cement-containing material or any material that can create a cementitious reaction in a formulation. In one embodiment, the cementitious material is selected from the group consisting of: calcium silicate cements, calcium aluminate cements, calcium sulfoaluminate cements, phosphate cements, magnesium oxychloride cements, magnesium oxysulfate cements, magnesium phosphate cements, and combinations thereof. For example, the cement may comprise any Type of Portland cement or other suitable cements, including hydraulic cements and quick set cements. In one embodiment, the cement comprises Portland cement Type III, which has a smaller particle size than other Types. In other embodiments, quick lime or hydrated lime is added to react with amorphous silica, aluminates, or gypsum to create a cementitious reaction.

The gypsum stucco may be any suitable gypsum powder known in the art. In one embodiment, the gypsum stucco comprises hemihydrate gypsum stucco, such as alpha hemihydrate gypsum, beta hemihydrate gypsum, or a combination thereof.

In certain embodiments, other additives or agents may be combined with the gypsum stucco, water, and the cementitious material to form the slurry. Such additional agents may be included to control the setting and strength development. For example, one or more accelerators, dispersants, retarders, seeding materials, or combinations thereof, may be combined with the gypsum stucco, water, and cementitious material. Reactive additives containing amorphous silica, such as silica fume, diatomaceous earth, pumice, fly ash, slag, or a combination thereof, may also be combined with the gypsum stucco, water, and cementitious material. In one embodiment, glass fibers, polymer fibers, cellulose fibers, other material fibers, or a combination thereof are combined with the gypsum stucco, water, and cementitious material.

In certain embodiments, the step of combining the gypsum stucco, water, and cementitious material includes combining some or all of the dry ingredients together and subsequently combining the dry ingredients with the liquid ingredients, including the water. For example, the cementitious material and the gypsum stucco may first be combined to form a dry mix that is subsequently combined with the water. In one embodiment, the dry mix includes the cementitious material in an amount from 0.1 percent to 10 percent by weight of the dry mix. For example, the dry mix may include the cementitious material in an amount from about 0.5 percent to about 3 percent by weight of the dry mix, from about 0.5 percent to about 2 percent by weight of the dry mix, or from about 0.7 percent to about 1.5 percent by weight of the dry mix. In one embodiment, the slurry includes water in an amount from about 50 percent to about 100 percent by weight of the dry mix.

In certain embodiments, the slurry is set and dried to form a gypsum composite. For example, the setting may be necessary to harden the gypsum composite quickly. For example, setting and drying the slurry may include drying the composite in an oven or other suitable drying apparatus, heating the slurry under moist or steamed conditions, and/or allowing gypsum composite to harden quickly. In certain embodiments, the gypsum slurry setting and drying the slurry includes curing the slurry between two facers, which may be paper, non-woven glass, or other suitable mats.

Composites

In certain embodiments, gypsum composites are provided. A gypsum composite may include a cured composite of gypsum and a cementitious material.

For example, the gypsum may be formed from or include alpha hemihydrate gypsum, beta hemihydrate gypsum, or a combination thereof. Upon rehydration of the gypsum hemihydrate during the manufacturing process, gypsum dihydrate is formed. Thus, the gypsum present in a set composite refers to gypsum dihydrate, whereas the gypsum stucco combined with water to form the composite refers to gypsum hemihydrate.

The cementitious material may be selected from the group consisting of: calcium silicate cements, calcium aluminate cements, calcium sulfoaluminate cements, phosphate cements, magnesium oxychloride cements, magnesium oxysulfate cements, magnesium phosphate cements, and combinations thereof. For example, the cementitious material may include Portland cement Type III. In other embodiments, quick lime or hydrated lime is added to react with amorphous silica, aluminates, aluminum hydroxide, or gypsum to create a cementitious reaction.

In certain embodiments, the composite includes the cementitious material in an amount from 0.1 percent to 10 percent by weight. For example, the composite may include the cementitious material in an amount from about 0.5 percent to about 3 percent by weight of the dry mix, from about 0.5 percent to about 2 percent by weight of the dry mix, or from about 0.7 percent to about 1.5 percent by weight of the dry mix.

In one embodiment, the cured composite also includes one or more accelerators, dispersants, retarders, seeding materials, or combinations thereof. In one embodiment, the composite also includes amorphous silica containing materials, such as silica fume, diatomaceous earth, pumice, fly ash, slag, or a combination thereof. In one embodiment, the cured composite also includes glass fibers, polymer fibers, or a combination thereof.

Without being bound by a particular theory, it is believed that hydrated cement improves the bonding in the gypsum composite, resulting in improved stiffness and hardness, and resistance to water and deflection/sagging at both ambient and elevated temperatures. For example, in composites containing glass fibers, which may be embedded in the matrix for strength and to prevent dimensional change, it is believed that the cement improves the bonding between the glass fibers and the gypsum through the cementitious reaction. Thus, the addition of cement to gypsum composites containing glass fibers is thought to increase the reinforcing effect of the glass fibers.

Embodiments of the present disclosure further include any one or more of the following paragraphs:

1. A method of making a gypsum composite, comprising: combining gypsum stucco, water, and a cementitious material to form a slurry; and setting and drying the slurry to form a gypsum composite.
2. The method of paragraph 1, wherein the gypsum stucco comprises alpha hemihydrate gypsum, beta hemihydrate gypsum, or a combination thereof
3. The method of paragraphs 1 or 2, wherein the cementitious material is selected from the group consisting of: calcium silicate cements, calcium aluminate cements, calcium sulfoaluminate cements, phosphate cements, magnesium oxychloride cements, magnesium oxysulfate cements, magnesium phosphate cements, quick set cements, and combinations thereof
4. The method of paragraphs 1 or 2, wherein the cementitious material comprises Portland cement Type III.
5. The method of paragraphs 1 to 4, wherein the cementitious material comprises quick lime or hydrated lime.
6. The method of paragraphs 1 to 5, wherein combining gypsum stucco, water, and cementitious material comprises first combining the cementitious material and the gypsum stucco to form a dry mix and subsequently combining the dry mix with the water.
7. The method of paragraph 6, wherein the dry mix comprises the cementitious material in an amount from 0.1 percent to 10 percent by weight of the dry mix.
8. The method of paragraph 6, wherein the dry mix comprises the cementitious material in an amount from about 0.5 percent to about 3 percent by weight of the dry mix.
9. The method of paragraphs 1 to 8, wherein the slurry comprises water in an amount from about 50 percent to about 100 percent by weight of the dry mix.
10. The method of paragraphs 1 to 9, wherein the step of combining gypsum stucco, water, and the cementitious material to form the slurry further comprises combining one or more accelerators, dispersants, retarders, seeding materials, or combinations thereof, with the gypsum stucco, water, and cementitious material.
11. The method of paragraphs 1 to 10, wherein the step of combining gypsum stucco, water, and the cementitious material to form a slurry further comprises combining silica fume, diatomaceous earth, pumice, flyash, slag, colloidal silica, sodium silicates, aluminates, aluminum hydroxide, or a combination thereof, with the gypsum stucco, water, and cementitious material.
12. The method of paragraphs 1 to 11, wherein the step of combining gypsum stucco, water, and the cementitious material to form the slurry further comprises combining glass fibers, polymer fibers, cellulose fibers, other natural fibers, or a combination thereof, with the gypsum stucco, water, and cementitious material.
13. A gypsum composite, comprising gypsum and a cementitious material.
14. The gypsum composite of paragraph 13, wherein the gypsum is formed from gypsum stucco comprising alpha hemihydrate gypsum, beta hemihydrate gypsum, or a combination thereof
15. The gypsum composite of paragraphs 13 or 14, wherein the cementitious material is selected from the group consisting of: calcium silicate cements, calcium aluminate cements, calcium sulfoaluminate cements, phosphate cements, magnesium oxychloride cements, magnesium oxysulfate cements, magnesium phosphate cements, quick set cements, and combinations thereof
16. The gypsum composite of paragraphs 13 or 14, wherein the cementitious material comprises Portland cement Type III.
17. The gypsum composite of paragraphs 13 to 16, wherein the cementitious material comprises quick lime or hydrated lime.
18. The gypsum composite of paragraphs 13 to 17, wherein the composite comprises cementitious material in an amount from 0.1 percent to 10 percent by weight.
19. The gypsum composite of paragraphs 13 to 17, wherein the composite comprises cementitious material in an amount from about 2 percent to about 3 percent by weight.
20. The gypsum composite of paragraphs 13 to 19, wherein the composite further comprises one or more accelerators, dispersants, retarders, seeding materials, or combinations thereof
21. The gypsum composite of paragraphs 13 to 20, wherein the composite further comprises silica fume, diatomaceous earth, pumice, flyash, slag, colloidal silica, sodium silicates, aluminates, aluminum hydroxide, or a combination thereof
22. The gypsum composite of paragraphs 13 to 21, wherein the composite further comprises glass fibers, polymer fibers, cellulose fibers, other natural fibers, or a combination thereof.

While the disclosure has been described with reference to a number of embodiments, it will be understood by those skilled in the art that the disclosure is not limited to such disclosed embodiments. Rather, the disclosed embodiments can be modified to incorporate any number of variations, alterations, substitutions, or equivalent arrangements not described herein, but which are commensurate with the spirit and scope of the disclosure. Additionally, while various features of the invention have been described, it is to be understood that aspects of the invention may include only some of the described features. Moreover, while features of the embodiments have been discussed separately, it should be understood that any of the features disclosed herein may be combined in a gypsum composite or method for making the same, with or without any other of the features or combinations of features. Accordingly, the invention is not to be seen as limited by the foregoing description, but is only limited by the scope of the appended claims.

What is claimed is:

1. A method of making a gypsum composite, comprising:
   combining beta hemihydrate gypsum stucco, water, and a cementitious material to form a slurry comprising the cementitious material in an amount from 0.7 percent to 1.5 percent by dry weight; and
   setting and drying the slurry to form a gypsum composite comprising a gypsum panel,
   wherein the slurry comprises water in an amount from about 50 percent to about 100 percent by weight of dry components,
   wherein setting and drying the slurry comprises curing the slurry between two facer mats.

2. The method of claim 1, wherein the cementitious material is selected from the group consisting of: calcium silicate cements, calcium aluminate cements, calcium sulfoaluminate cements, phosphate cements, magnesium oxychloride cements, magnesium oxysulfate cements, magnesium phosphate cements, quick set cements, and combinations thereof.

3. The method of claim 1, wherein the cementitious material comprises Portland cement Type III.

4. The method of claim 1, wherein the cementitious material comprises quick lime or hydrated lime.

5. The method of claim 1, wherein combining gypsum stucco, water, and cementitious material comprises first combining the cementitious material and the gypsum stucco to form a dry mix and subsequently combining the dry mix with the water.

6. The method of claim 1, wherein the step of combining gypsum stucco, water, and the cementitious material to form the slurry further comprises combining one or more accelerators, dispersants, retarders, seeding materials, or combinations thereof, with the gypsum stucco, water, and cementitious material.

7. The method of claim 1, wherein the step of combining gypsum stucco, water, and the cementitious material to form a slurry further comprises combining silica fume, diatomaceous earth, pumice, flyash, slag, colloidal silica, sodium silicates, aluminates, aluminum hydroxide, or a combination thereof, with the gypsum stucco, water, and cementitious material.

8. The method of claim 1, wherein the step of combining gypsum stucco, water, and the cementitious material to form the slurry further comprises combining glass fibers, polymer fibers, cellulose fibers, other natural fibers, or a combination thereof, with the gypsum stucco, water, and cementitious material.

9. The method of claim 1, wherein the two facer mats comprise paper mats.

10. The method of claim 1, wherein the two facer mats comprise non-woven glass mats.

11. The method of claim 1, wherein the cementious material comprises Portland cement.

* * * * *